United States Patent [19]

Owa et al.

[11] Patent Number: 5,587,984
[45] Date of Patent: Dec. 24, 1996

[54] HOLOGRAM PRINTED ON OPTICAL RECORDING MEDIUM FOR COPY PROTECTION

[75] Inventors: Hideo Owa; Seiji Kobayashi, both of Kanagawa, Japan

[73] Assignee: Sony Corporation, Tokyo, Japan

[21] Appl. No.: 525,191

[22] Filed: Sep. 8, 1995

[30] Foreign Application Priority Data

Sep. 13, 1994 [JP] Japan ..................... 6-218543

[51] Int. Cl.$^6$ ..................... G11B 7/00
[52] U.S. Cl. ............ 369/103; 369/84; 369/275.5; 369/280; 369/286.6; 369/DIG. 1
[58] Field of Search ............... 369/103, 83, 84, 369/280, 275.5; 364/286.6; 380/3.4

[56] References Cited

U.S. PATENT DOCUMENTS

| | | | |
|---|---|---|---|
| 5,091,965 | 2/1992 | Kobayashi et al. | 382/15 |
| 5,453,968 | 9/1995 | Veldhuis et al. | 369/84 |
| 5,513,260 | 4/1996 | Ryan | 380/3 |

*Primary Examiner*—Georgia Y. Epps
*Assistant Examiner*—Kim-Kwok Chu
*Attorney, Agent, or Firm*—William S. Frommer; Alvin Sinderbrand

[57] ABSTRACT

An optical recording medium is disclosed, in which holograms for recording medium discrimination are recorded in a recording medium discrimination information recording area provided on the side of an inner circle within an information recording area on a compact disc. Thus, it is difficult to copy an original optical recording medium to produce a fake product, and it is possible to distinguish the original optical recording medium from the fake product by external appearance.

17 Claims, 6 Drawing Sheets b (n,m)

P(i,j)

HOLOGRAM PRINTED ON OPTICAL RECORDING MEDIUM FOR COPY PROTECTION

BACKGROUND OF THE INVENTION

1. Field of the Invention

This invention relates to an optical recording medium in which information signals are optically recorded and a signal recording method for recording information in the optical recording medium.

2. Description of the Related Art

For optical recording media, such as compact discs (CDs), for optical recording information signals like speech signals and data in a predetermined information recording area therein and for reproducing the recorded information signals, several techniques have been attempted for preventing pirated editions.

For example, a technique of inserting cryptogram in information signals to be recorded on the compact disc is employed.

Meanwhile, by reading the entire recorded information with a reproducing device, it is possible to easily copy the compact disc on which information signals are recorded by the foregoing technique. Thus, a compact disc which is apparently identical to the original one may be produced.

As a method for determining whether a compact disc is of the pirated edition or not, a technique of recording a pattern like a bar code or characters in an area other than the information recording area, that is, in an area in which information signals are not recorded is employed. With this technique, the copyright reserved is clarified. However, since the pattern like a bar code or characters in the above technique permits discriminating the contents simply by viewing, the same pattern of bar code or characters may easily be recorded on a compact disc of pirated edition. Accordingly, the compact disc of pirated edition may easily be produced.

OBJECT AND SUMMARY OF THE INVENTION

In view of the foregoing, it is an object of the present invention to provide an optical recording medium and a signal recording method whereby it is possible to prevent a pattern for discriminating pirated editions from being copied and to determine whether the optical recording medium is the original one or not without reproducing information signals recorded therein.

According to the present invention, there is provided an optical recording medium having signals optically recorded therein. The optical recording medium includes a hologram for recording medium discrimination recorded in an area other than an information recording area in which information signals are recorded.

The hologram is recorded in the optical recording medium by processes of cutting the hologram on a base plate by laser and producing a stamper from the base plate on which the hologram is cut.

The hologram is recorded in a form of two-dimensional signal pattern in the optical recording medium.

The hologram is identified using a diffraction image produced by radiating a light emitted from optical means other than an optical pickup for reproducing the information signals.

Plural holograms are provided in the area other than the information recording area. The holograms are discontinuously located at predetermined intervals.

The plural holograms are located at intervals of 2–5 mm.

The hologram is recorded in a recording/reproducing mode which differs from a recording/reproducing mode of the information signals.

The hologram is recorded in a CAV mode and the information signals are recorded in a CLV mode in the optical recording medium.

The hologram is recorded as a binary pattern with random distribution in the optical recording medium.

According to the present invention, there is also provided a signal recording method for recording signals in an optical recording medium. The method includes a first step of receiving information signals to be recorded in the optical recording medium, a second step of receiving a hologram for discriminating the optical recording medium, a third step of recording the information signal in an information recording area of the optical recording medium, and a fourth step of recording the hologram in an area other than the information recording area.

The fourth step includes a step of cutting the hologram on a base plate by laser, and a step of producing a stamper from the base plate on which the hologram is cut.

The hologram is in a form of two-dimensional signal pattern.

The fourth step further includes a step of, when plural holograms are received, locating the holograms discontinuously at predetermined intervals in the area other than the information recording area.

In the step of locating the holograms, the plural holograms are located at intervals of 2–5 mm.

In the step of cutting the hologram, the hologram is cut on the base plate in a recording/reproducing mode which differs from a recording/reproducing mode of the information signals.

The hologram is recorded in a CAV mode and the information signals are recorded in a CLV mode in the optical recording medium.

The third step further includes a step of converting the hologram to a binary pattern with random distribution.

With the present invention, the hologram for recording medium discrimination converted to the two-dimensional signal pattern is recorded in the area other than the information recording area of the optical recording medium in which the information signals are recorded. In this case, the recorded hologram for recording medium discrimination may be read by observing a diffraction image generated by irradiating the two-dimensional signal pattern with a light.

Also, the hologram for recording medium discrimination may easily be produced with a cutting machine used for recording the information signals in the information recording area. The hologram is difficult to track and therefore difficult to copy.

DESCRIPTION OF THE PREFERRED EMBODIMENT

A preferred embodiment of the present invention will now be described with reference to the attached drawings. FIG. 1 shows a schematic structure of an optical recording medium according to the present invention.

Figures 1A, 1B, 1C:
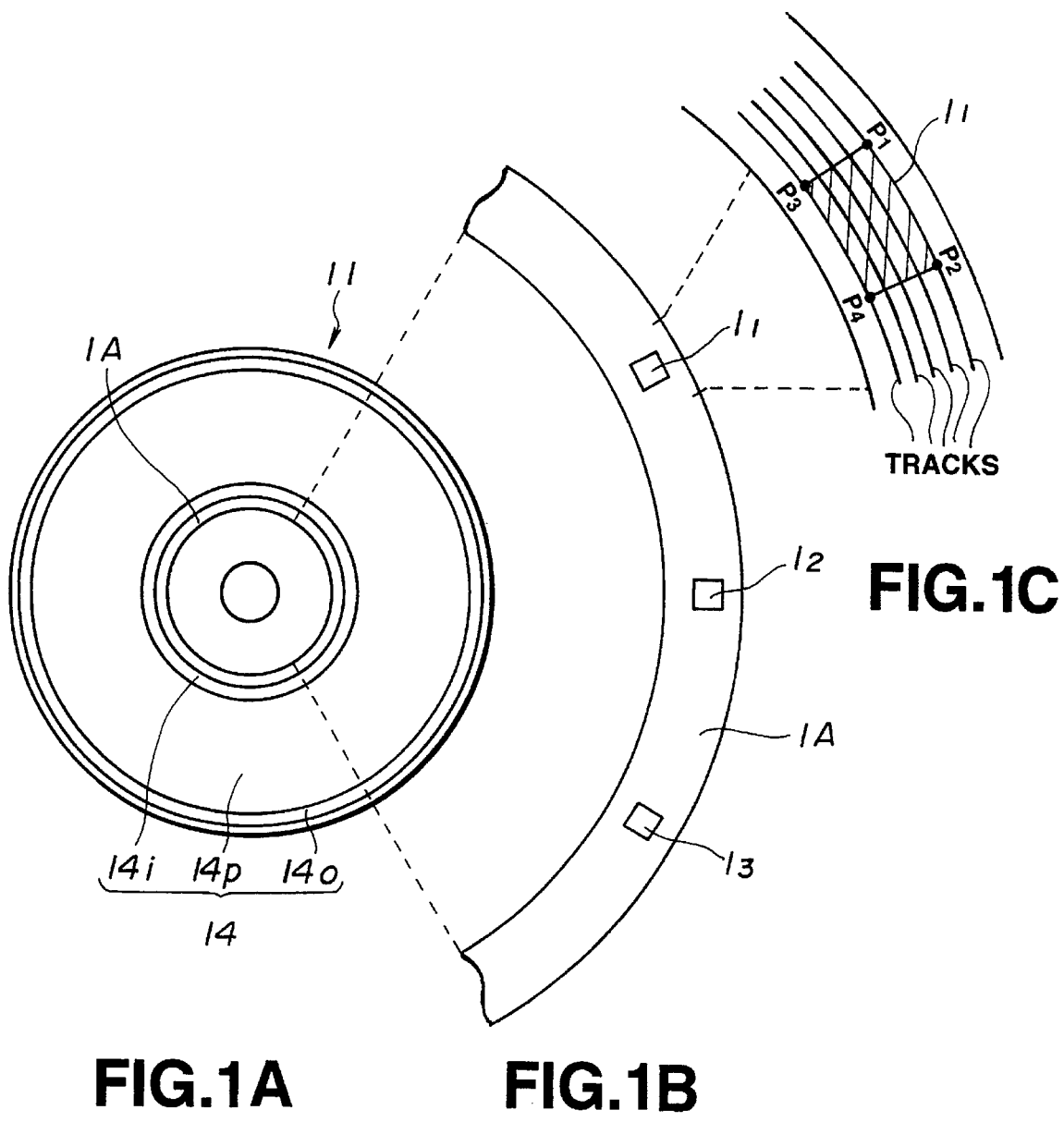
FIGS. 1A to 1C show a schematic structure of an optical recording medium according to the present invention.

The optical recording medium of this embodiment is a so-called compact disc. As shown in FIG. 1A, information signals are recorded in an information recording area 14 on a compact disc 11. Specifically, signals like speech signals or data are recorded in an information recording area $14_P$, and information relating to the contents of the information recorded in the information recording area $14_P$ is recorded in a lead-in area $14_I$ located in the inner circle of the information recording area $14_P$ and a lead-out area $14_O$ located in the outer circle of the information recording area $14_P$.

In the inner circle of the lead-in area $14_I$ of the compact disc 11, a recording medium discrimination information recording area IA is provided. In the recording medium discrimination information recording area IA, a hologram for discriminating a recording medium indicating the contents of the information recorded in the information recording area 14 of the compact disc 11 and the implementor of the information is recorded. Specifically, holograms $1_1$, $1_2$, $1_3$ ... are recorded, as shown in FIG. 1B. The holograms $1_1$, $1_2$, $1_3$ ... are recorded discontinuously at an interval of, for example, 5 mm so that the holograms may be not tracked.

The hologram in this case is produced by recording an interference fringe pattern by the an object light and a reference light obtained by irradiating an object with a coherent light, such as, a laser beam. Although it is conceivable to produce the hologram on the compact disc 11 with an optical technique to expose a photoresist film to a laser beam, producing the hologram optically is troublesome. In this embodiment, production of the hologram is simplified by calculating a signal pattern of data of the hologram by a computer and, after a cutting process, recording the signal pattern of the hologram on the compact disc 11 with a stamper. Thus, using the same device as a cutting device for cutting information signals in the information recording area 14, the hologram 1 may be produced in the recording medium discrimination information recording area IA by the cutting process, so that productivity improves.

Figure 2:
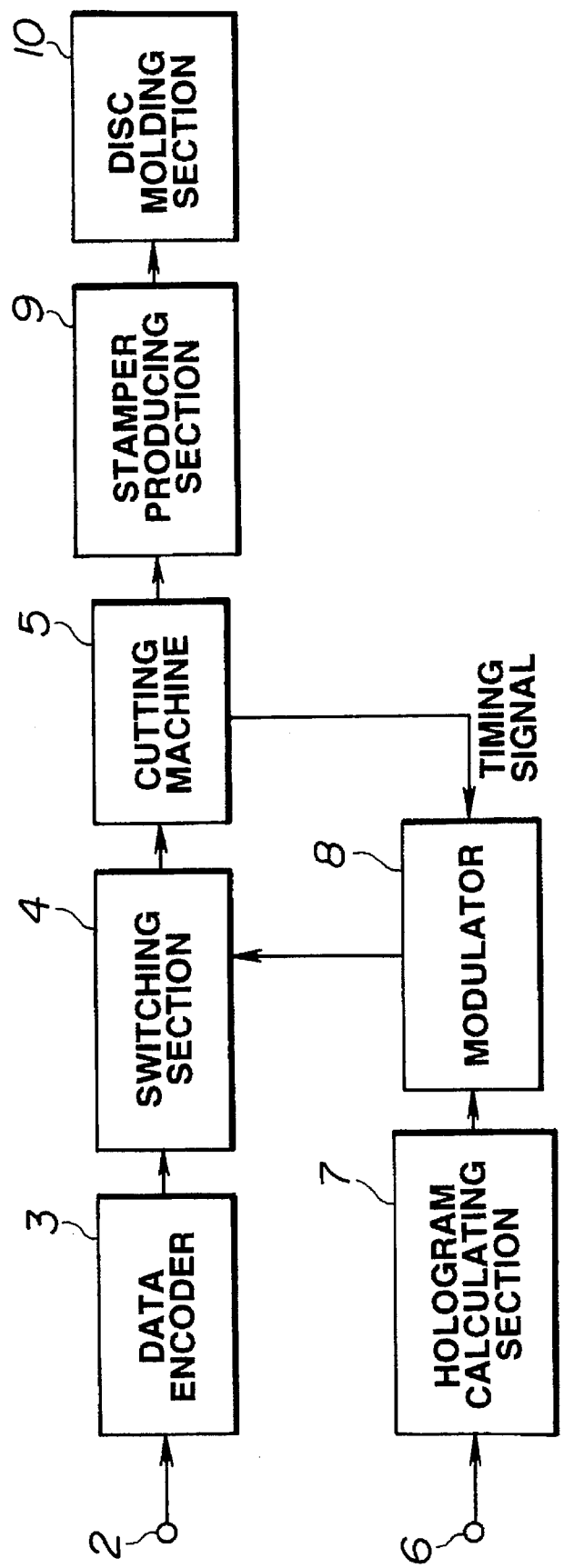
FIG. 2 shows a schematic structure of a recording device using a signal recording method according to the present invention.

FIG. 2 shows a schematic structure of a recording device which employs the recording method to record information signals and hologram signals by computer hologram in the compact disc 11 as shown in FIG.1.

A program source, such as, speech signals and data, is inputted at one signal input terminal 2 of FIG. 2. The program source is fed to a data encoder 3, which compression-encodes the program source and feeds it to a switching section 4.

Draft data of the hologram for recording medium discrimination is inputted at another signal input terminal 6. The draft data is fed to a hologram calculating section 7, which calculates a signal pattern of the hologram for recording medium discrimination using the draft data. The signal pattern of the hologram is fed to a modulator 8.

The modulator 8 is supplied with a timing signal which is synchronous with rotation of a cutting machine 5 on the basis of a frequency pulse from a frequency generator FG within the cutting machine 5. Thus, the modulator 8 modulates the signal pattern from the hologram calculating section 7 using the supplied timing signal so that the hologram signal may be adaptive to the cutting machine 5. The modulated hologram signal is fed to the switching section 4.

The switching section 4 switches the information signal of the program source from the data encoder 3 to the hologram signal from the modulator or vice versa in response to the recording area on the compact disc 11, and outputs the switched signal to the cutting machine 5.

In most cases, the information signal of the program source is recorded in a CLV mode employing a constant linear velocity. On the contrary, the hologram signal for recording medium discrimination is recorded in a CAV mode employing a constant angular velocity. Thus, the signal can be recorded as data capable of reproducing the original hologram from the signal pattern of the hologram for recording medium discrimination. Since the radius of the recording medium discrimination information recording area in which the hologram for recording medium discrimination is recorded differs from that of the information recording area in which the information signals are recorded on the compact disc 11, the information may be switched and separately recorded as described above.

Since the signal pattern of the hologram is a two-dimensional signal pattern, it may be copied when it is tracked. Therefore, the signal pattern of the hologram is to be recorded at intervals of 2–3 mm so that it cannot be tracked. To further improve the copy protection function, it is preferred to record the signal pattern of the hologram at an interval of 5 mm.

Specifically, when the hologram signal for recording medium discrimination and the information signal of the program source are recorded in different modes, the cutting machine 5 is first set to the CAV mode, and the hologram signal for recording medium discrimination is recorded in an area corresponding to the recording medium discrimination information recording area on a glass substrate (base plate). Then, the cutting machine 5 is stopped and the mode is switched to the CLV mode, so that the information signal of the program source is recorded in an area corresponding to the information recording area.

After the hologram for recording medium discrimination and the information signal are recorded on the glass substrate (base plate), a stamper producing section 9 produces a metal mold. A disc molding section 10 produces plural identical compact discs using the resulting stamper.

Calculation of the hologram signal for recording medium discrimination by the hologram calculating section 7 will now be described with reference to the flowchart of FIG. 3.

Figure 3:
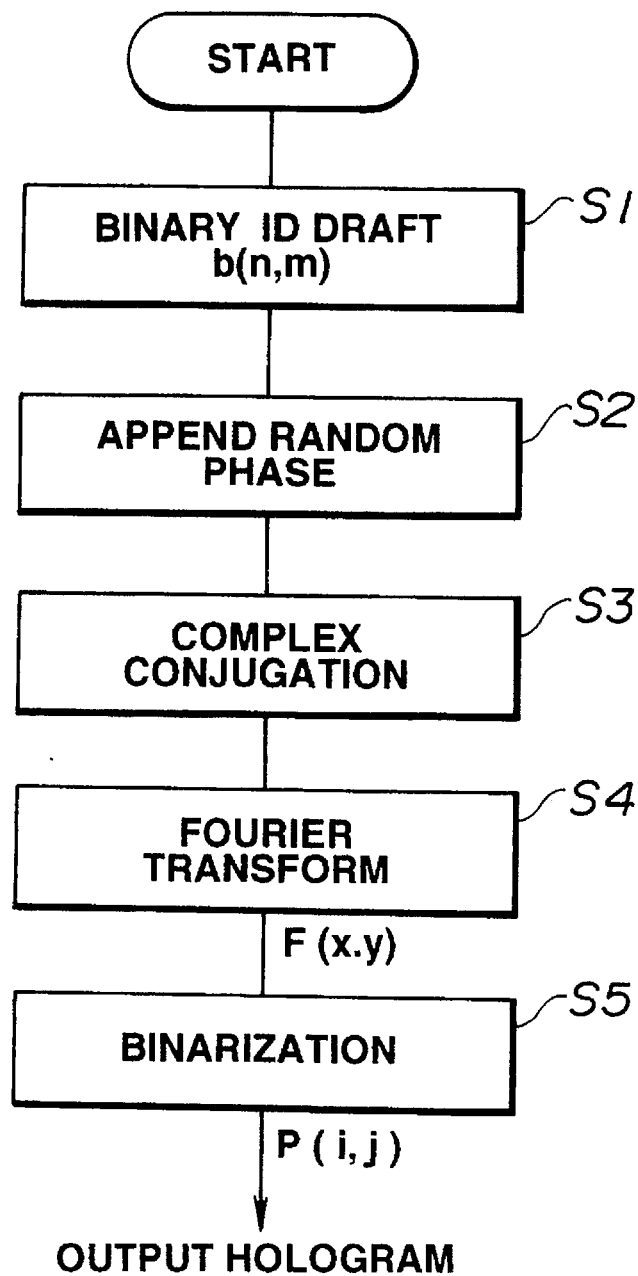
FIG. 3 is a flowchart for illustrating calculation of a hologram signal.
Figure 4A:
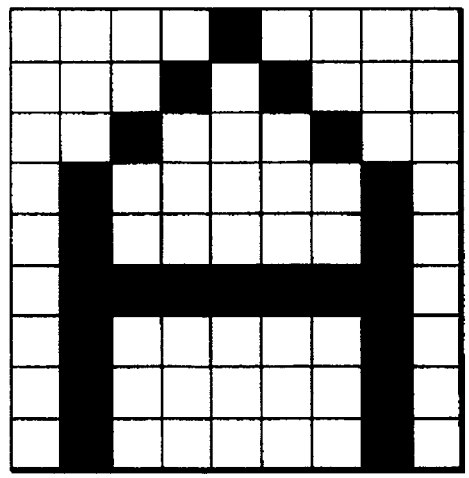
FIGS. 4A and 4B show specific examples of a draft of the hologram and a signal pattern thereof, respectively.

First, at step S1 of FIG. 3, a binary draft of the hologram for recording medium discrimination is formed. Specifically, as shown in FIG. 4A, a draft b(n,m) of a binary signal with a horizontal size of n and a vertical size of m is produced. Then, at step S2, the draft b(n,m) is multiplied by a random phase φ(n,m). At step S3, a complex signal C(n,m) is calculated. A calculation formula employed in this case is expressed by the following equation (1).

$$C(n,m)=b(n,m)\cdot\phi(n,m) \tag{1}$$

By multiplying the draft by the random phase, the energy does not concentrate at the central portion of the hologram and diffuses entirely, so that the quality of the reproduced image can be improved.

The resulting signal C(n,m) represents a complex number with its phase randomly changing. In order to express the result of Fourier transform of this signal C(n,m) by a real number, a complex conjugate component is appended to a position symmetrical with respect to the origin. Calculation formulas employed in this operation are expressed by the following equations (2) and (3).

$$Q(-n,-m)=C^*(n,m) \tag{2}$$

$$Q(n,m)=C(n,m) \tag{3}$$

At step S4, the resulting complex signal Q(n,m) is transformed by two-dimensional Fourier transform to generate a real signal F(x,y). The real signal F(x,y) is expressed by the following equation (4).

$$F(x,y)=F\{Q(n,m)\} \tag{4}$$

At step S5, the real signal F(x,y) is sampled at an interval of Δ and binarized. The simplest binarization technique is to determine a binary pattern on the basis of polarity of the real signal F(x,y). For example, if F(Δi,Δj)>0, the binary pattern p(i,j) is 1. If F(Δi,Δj)≤0, the binary pattern p(i,j) is 0.

The foregoing technique of calculating the hologram signal is the simplest one, whereby an analog signal is simply transformed to a binary signal. Also, the U.S. Pat. No. 5,091,965 discloses a technique of transforming an analog signal to a binary signal by calculating a threshold value of each nerve and a coefficient of each innervation unit of a nerve net circuit based on the analog signal and predetermined functions. With this quantization method, a satisfactory reproduced image having less quantization noise may be produced.

Figure 4B:
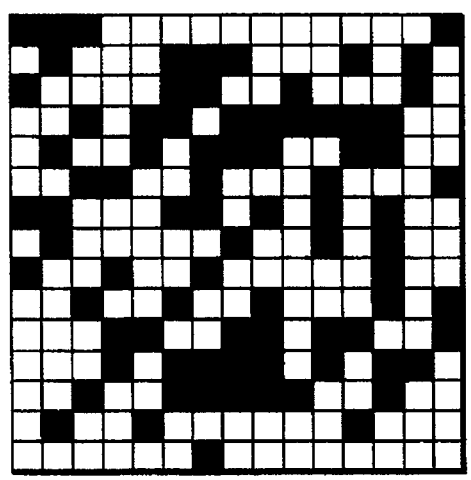

The binary pattern p(i,j) thus generated has random distribution as shown in FIG. 4B.

Figure 5:
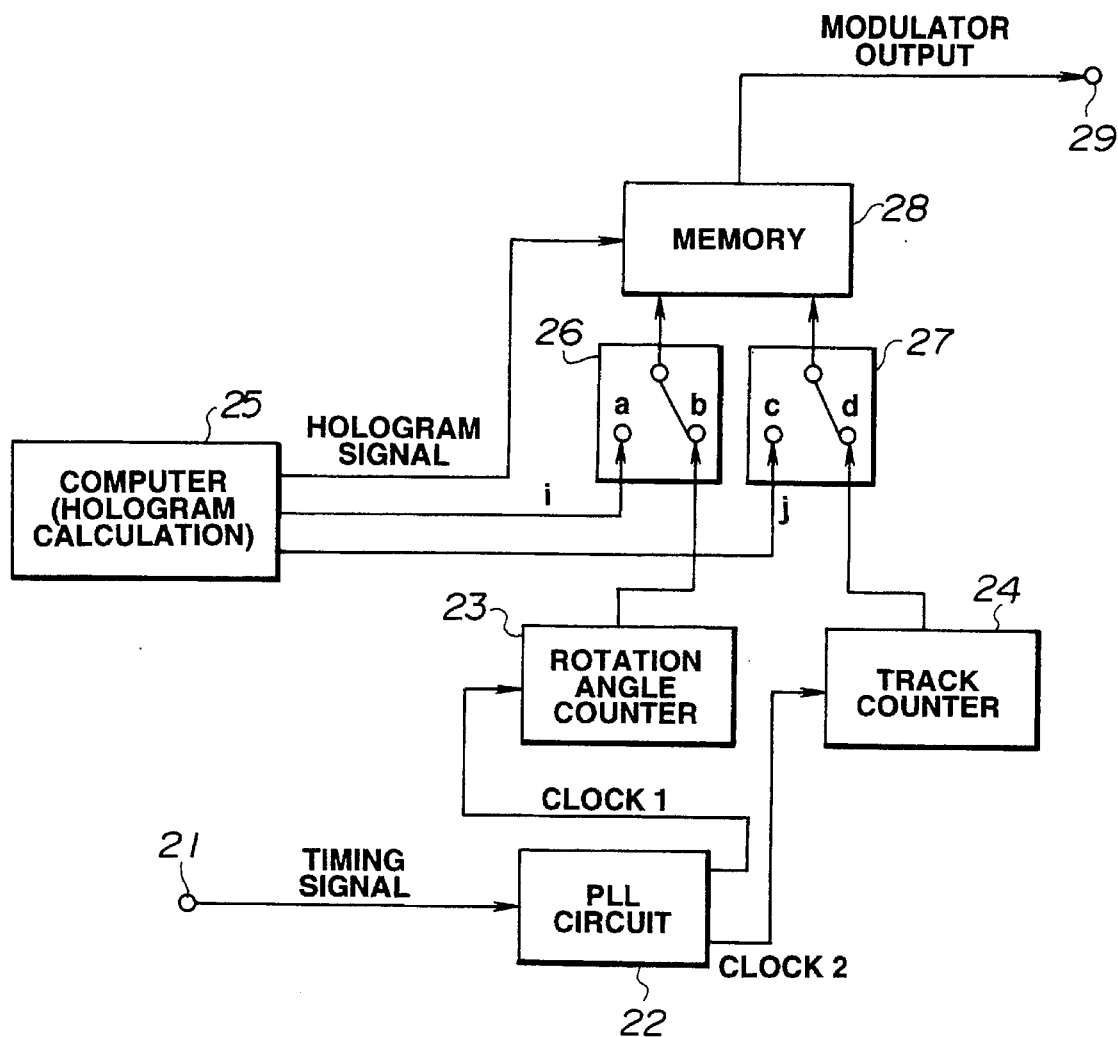
FIG. 5 shows a schematic structure of a modulator

FIG. 5 shows the specific structure of the modulator 8 for modulating the binary pattern p(i,j) generated by the hologram calculating section 7 of FIG. 2, in recording the pattern.

The binary pattern p(i,j) is calculated specifically within a computer 25. The value i corresponding to the x-coordinate of the binary pattern p(i,j) is inputted to a terminal a of a signal switching section 26, and the value j corresponding to the y-coordinate is inputted to a terminal c of a signal switching section 27.

In the cutting machine of FIG. 2, before the binary pattern p(i,j) is recorded on the compact disc 11, the terminal a of the signal switching section 26 and the terminal c of the signal switching section 27 are selected so that the binary pattern p(i,j) is transmitted and stored in a memory 28. In this case, the value i and the value j are caused to correspond to a subordinate address and a superordinate address, respectively, within the memory 28.

The timing signal from the cutting machine 5 of FIG. 2 is inputted from a signal input terminal 21 to a PLL circuit 22. The PLL circuit 22 generates a clock signal which is synchronous with the rotation of the compact disc 11 and a clock signal changing once in one rotational turn. The clock signal synchronous with the rotation of the compact disc 11 is fed to a rotation angle counter 23, and the clock signal changing once in one rotational turn is fed to a track counter 24.

The rotation angle counter 23 counts the signal in proportion to the rotation angle of the compact disc 11, and outputs the count value to a terminal b of the signal switching section 26. The track counter 24 counts the signal varying from track to track, and outputs the count value to a terminal d of the signal switching section 27.

After the binary pattern p(i,j) is stored in the memory 28, the terminal b of the signal switching section 26 and the terminal d of the signal switching section 27 are selected so that the count values from the rotation angle counter 23 and the track counter 24 are fed to the memory 28. The binary pattern stored in the memory 28 is read out by these two count values, and is outputted at a signal output terminal 29. These operations are carried out for the following reason. That is, when the hologram $1_1$ is formed to traverse the track as shown in FIG. 1C, the binary pattern corresponding to one hologram stored in the memory 28 must fit within a hologram area surrounded by points $P_1$ to $P_4$. The binary pattern is recorded as a pit on the compact disc 11 by the cutting machine 5 of FIG. 2. In this case, the rotation angle is employed instead of the x-coordinate, and the track count value is employed instead of the y-coordinate. However, since the rotation angle and the track count value substantially coincide with the x-coordinate and the y-coordinate on the compact disc, respectively, when the hologram is small, the binary pattern p(i,j) as shown in FIG. 4B is recorded.

Figure 6:
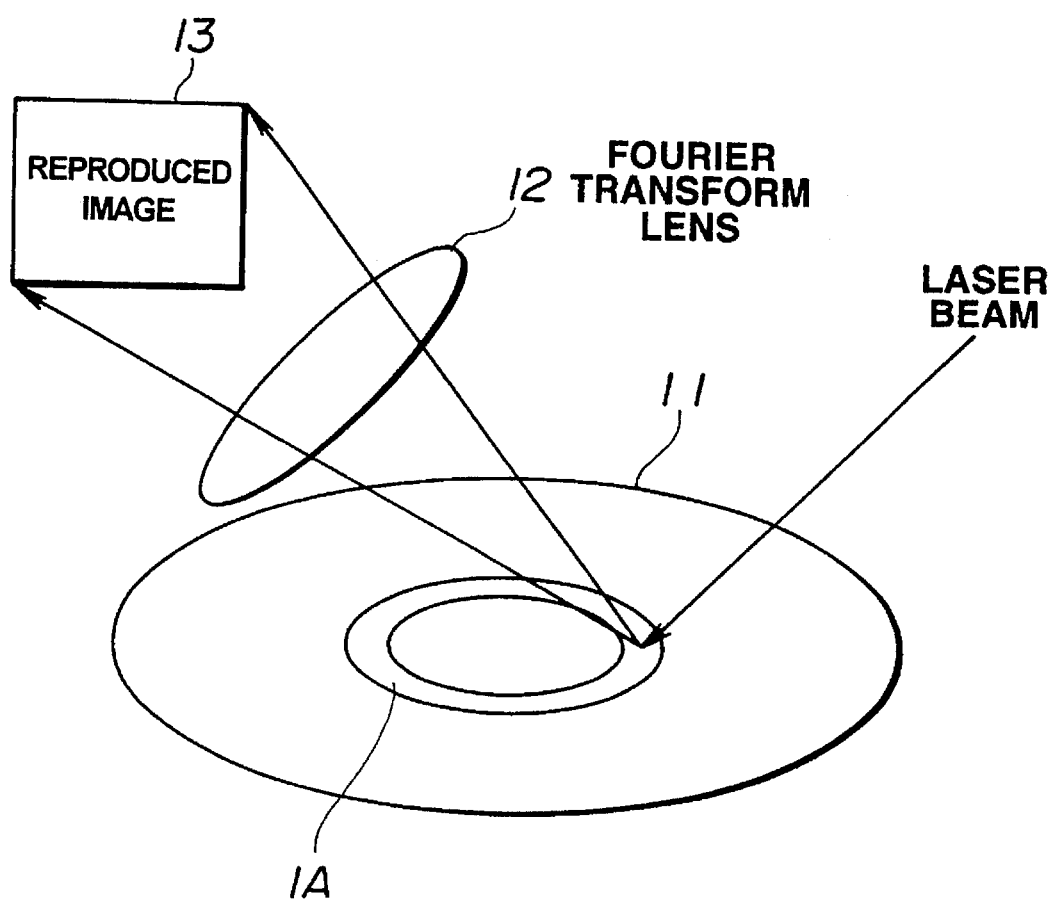
FIG. 6 illustrates reproduction of the hologram.

Thus, when the hologram is to be reproduced from the compact disc 11 on which the signal pattern of hologram for recording medium discrimination is recorded as the hologram, a laser beam emitted from a unit other than the optical pickup for data reproduction is radiated to the compact disc 11 and the diffraction image of the hologram 1 is observed with a Fourier transform lens 12, as shown in FIG. 6. Thus, the reproduced image of the hologram for recording medium discrimination which is originally provided may be produced as, for example, a reproduced image 13.

The Fourier transform lens 12 is provided between the hologram 1 and the reproduced image 13 to generate a satisfactory diffraction signal. However, the hologram for recording medium discrimination may also be observed without using the Fourier transform lens 12.

As is clear from the above description, with the optical recording medium according to the present invention, since the hologram for recording medium discrimination is recorded in the area other than the information recording area for recording information signals therein, it is difficult to copy the original optical recording medium to produce a fake product. Also, since the hologram may be observed with a simple reproducing device, the original optical recording medium may easily be distinguished from a fake optical recording medium by external appearance. Thus, this invention contributes to exposure of a pirated edition in combination with legal regulations.

The hologram for recording medium discrimination is recorded in the form of two-dimensional signal pattern, and may be recognized through observation of the diffraction generated by irradiating the signal pattern with the light. Also, the hologram for recording medium discrimination may be produced with the existent mastering facilities for recording information signals. Therefore, the optical recording medium may be produced easily.

As the holograms for recording medium discrimination are discontinuously located at such intervals that the holograms cannot be tracked, it is difficult to copy the original optical recording medium to produce a fake product.

What is claimed is:

1. An optical recording medium having signals optically recorded therein, the optical recording medium comprising a hologram for recording medium discrimination recorded in an area other than an information recording area in which information signals are recorded.

2. The optical recording medium as claimed in claim 1, wherein the hologram is recorded in the optical recording medium by processes of cutting the hologram on a base plate of the recording medium by laser and producing a stamper from the base plate of the recording medium on which the hologram is cut.

3. The optical recording medium as claimed in claim 2, wherein the hologram is recorded in a form of two-dimensional signal pattern in the optical recording medium.

4. The optical recording medium as claimed in claim 2, wherein the hologram is identified using a diffraction image produced by radiating a light emitted from optical means other than an optical pickup for reproducing the information signals.

5. The optical recording medium as claimed in claim 2, wherein plural holograms are provided in the area other than the information recording area, the holograms being discontinuously located at predetermined intervals.

6. The optical recording medium as claimed in claim 5, wherein the plural holograms are located at intervals of 2–5 mm.

7. The optical recording medium as claimed in claim 2, wherein the hologram is recorded in a recording/reproducing mode which differs from a recording/reproducing mode of the information signals.

8. The optical recording medium as claimed in claim 7, wherein the hologram is recorded in the optical recording medium in a CAV mode and wherein the information signals are recorded in the optical recording medium in a CLV mode.

9. The optical recording medium as claimed in claim 2, wherein the hologram is recorded as a binary pattern with random distribution in the optical recording medium.

10. A signal recording method for recording signals in an optical recording medium, the method comprising:

a first step of receiving information signals to be recorded in the optical recording medium;

a second step of receiving a hologram for discriminating the optical recording medium;

a third step of recording the information signal in an information recording area of the optical recording medium; and a fourth step of recording the hologram in an area other than the information recording area.

11. The signal recording method as claimed in claim 10, wherein the fourth step comprises a step of cutting the hologram on a base plate of the recording medium by laser, and a step of producing a stamper from the base plate on which the hologram is cut.

12. The signal recording method as claimed in claim 11, wherein the hologram is in a form of two-dimensional signal pattern.

13. The signal recording method as claimed in claim 11, wherein the fourth step further comprises a step of, when plural holograms are received, locating the holograms discontinuously at predetermined intervals in the area other than the information recording area.

14. The signal recording method as claimed in claim 13, wherein in the step of locating the holograms, the plural holograms are located at intervals of 2–5 mm.

15. The signal recording method as claimed in claim 11, wherein in the step of cutting the hologram, the hologram is cut on the base plate of the recording medium in a recording/reproducing mode which differs from a recording/reproducing mode of the information signals.

16. The signal recording method as claimed in claim 15, wherein the hologram is recorded in the optical recording medium in a CAV mode and wherein the information signals are recorded in the optical recording medium in a CLV mode.

17. The signal recording method as claimed in claim 11, wherein the third step further comprises a step of converting the hologram to a binary pattern with random distribution.

* * * * *